United States Patent
Nordenhem

(10) Patent No.: US 10,549,971 B2
(45) Date of Patent: *Feb. 4, 2020

(54) GUIDE-ROLL ARRANGEMENT FOR GUIDING RELATIVE MOVEMENT OF MAST SEGMENTS OF A LIFT-TRUCK AND A LIFT-TRUCK COMPRISING A GUIDE-ROLL ARRANGEMENT

(71) Applicant: Toyota Material Handling Manufacturing Sweden AB, Mjölby (SE)

(72) Inventor: Mikael Nordenhem, Vikingstad (SE)

(73) Assignee: Toyota Material Handling Manufacturing Sweden AB, Mjölby (SE)

( * ) Notice: Subject to any disclaimer, the term of this patent is extended or adjusted under 35 U.S.C. 154(b) by 244 days.

This patent is subject to a terminal disclaimer.

(21) Appl. No.: 15/371,705

(22) Filed: Dec. 7, 2016

(65) Prior Publication Data

US 2017/0166425 A1    Jun. 15, 2017

(30) Foreign Application Priority Data

Dec. 9, 2015   (SE) ........................................ 1551613

(51) Int. Cl.
*B66F 9/08* (2006.01)
*F16C 29/04* (2006.01)
*B66F 9/07* (2006.01)

(52) U.S. Cl.
CPC .................. *B66F 9/08* (2013.01); *B66F 9/07* (2013.01); *F16C 29/04* (2013.01)

(58) Field of Classification Search
CPC ........... B66F 9/08; F16C 13/006; F16C 29/04
See application file for complete search history.

(56) References Cited

U.S. PATENT DOCUMENTS

| 2,881,031 A | * | 4/1959 | Comfort | ................... | B66F 9/08 187/238 |
| RE25,432 E | * | 8/1963 | Barnes | ...................... | B66F 9/08 187/226 |

(Continued)

FOREIGN PATENT DOCUMENTS

| SE | 460116 | 9/1989 |
| WO | 2006024522 | 3/2006 |

OTHER PUBLICATIONS

Slide _ Definition of Slide at Dictionary.com.*

(Continued)

*Primary Examiner* — Minh Truong
(74) *Attorney, Agent, or Firm* — Quarles & Brady LLP

(57) ABSTRACT

A guide-roll arrangement for guiding movement of a second mast segment relative a first mast segment of a lift-truck, comprising a roll pin having opposing first and second ends, wherein the first end comprises a recess, and a roll supported on the roll pin; and a sliding element arranged in the recess, said sliding element comprising opposing contact and sliding surfaces, wherein a support piece is arranged in the recess and comprising a contact surface for supporting the sliding element, wherein the contact surface of the sliding element is supported on the contact surface of the support piece and wherein one of the contact surfaces of the support piece and the sliding element is concave and the other is convex.

14 Claims, 4 Drawing Sheets

(56) References Cited

U.S. PATENT DOCUMENTS

| | | | | | |
|---|---|---|---|---|---|
| 3,148,005 | A | * | 9/1964 | Pusztay | B66F 9/08 187/238 |
| 3,365,253 | A | * | 1/1968 | Haller | F16C 13/006 384/44 |
| 3,414,086 | A | * | 12/1968 | Ulinski | B66F 9/08 187/230 |
| 3,605,950 | A | * | 9/1971 | Goodacre | B66F 9/08 187/226 |
| 3,909,066 | A | * | 9/1975 | Snowden | B60B 5/02 301/108.1 |
| 4,035,040 | A | * | 7/1977 | Yarris | B60B 35/02 301/5.7 |
| 4,060,151 | A | * | 11/1977 | Chelin | B66B 7/04 187/226 |
| 4,234,057 | A | | 11/1980 | Nakane et al. | |
| 4,375,247 | A | | 3/1983 | McNeely | |
| 4,709,786 | A | * | 12/1987 | David | B66F 9/10 187/226 |
| 4,842,424 | A | * | 6/1989 | Narkon | F16C 13/006 384/203 |
| 4,914,712 | A | | 4/1990 | Ikimi et al. | |
| 2008/0242523 | A1 | * | 10/2008 | Stief | F16C 13/006 492/7 |
| 2017/0167536 | A1 | * | 6/2017 | Nordenhem | F16C 29/04 |

OTHER PUBLICATIONS

Sliding _ Definition of Sliding by Merriam-Webster.*
Notice of Allowance from the Swedish Patent Office, dated Jun. 27, 2017, for Swedish Patent Application No. 1551613-1; pp. 1-4.

* cited by examiner

GUIDE-ROLL ARRANGEMENT FOR GUIDING RELATIVE MOVEMENT OF MAST SEGMENTS OF A LIFT-TRUCK AND A LIFT-TRUCK COMPRISING A GUIDE-ROLL ARRANGEMENT

CROSS-REFERENCE TO RELATED APPLICATIONS

This application claims the priority benefit of Swedish Patent Application No. 1551613-1 filed Dec. 9, 2015, the contents of which is hereby incorporated by reference as if set forth in its entirety herein.

TECHNICAL FIELD

The present disclosure relates to a guide-roll arrangement for guiding movement of a second mast segment relative a first mast segment of a lift-truck. The present disclosure also relates to a lift-truck comprising a guide-roll arrangement.

BACKGROUND ART

Lift-trucks comprise various parts that are movable axially relative each other or with respect to the chassis of the truck. For example, an extendable mast of the lift-truck may comprise two or more mast segments which are slidable arranged in each other so that the segments may be moved apart and extended telescopically. The lift-truck may further comprise a movable carrier which supports components of the lift-truck. For example the lift-truck may comprise a carrier for supporting load engagement means such as forks or clamping means. The carrier is arranged to be moved along a mast segment of the lifting mast of the lift-truck. A lift-truck comprising load engagement means in the form of a lifting fork is typically denominated a forklift-truck. In so-called reach lift-trucks, the mast of the lift-truck is attached to a carrier, i.e. a mast carriage, which is movable along an element of the lift-truck, for example along the support legs of the lift-truck or along a U-beam in the support legs.

Typically, guide-rolls are provided to ensure a smooth axial movement of one part relative the other part. For example, guide rolls may be arranged between a fixed mast segment and a movable mast segment of an extendable mast. The hub of a guide-roll is thereby attached to one of the mast segments whereby the roll itself engages one of the opposing sidewalls of a track which extends along the other mast segment. A carrier for load engagement means may be provided with guide rolls which run in tracks on the inner mast segment of the lift-truck.

The guide-roll stabilizes the relative movement of the parts in the intended axial direction of movement since the surface of the guide roll is in contact with one of the opposing sidewalls of the track. However, to ensure a completely smooth relative movement between the parts it may often be necessary to prevent movement between the movable parts in directions which are non-parallel to the intended axial direction of movement. For this purpose, the guide roll may comprise a sliding block which protrudes from the hub of the guide roll and is arranged to slide along the bottom of the track. Examples of guide-rolls with sliding blocks for lift-trucks are disclosed in the documents WO2006024522, U.S. Pat. Nos. 4,234,057, 4,914,712, SE460116 and U.S. Pat. No. 4,375,247.

However, occasionally the tracks in which the guide-rolls run are not sufficiently straight, for example the bottom of the flanged track may be uneven. It is also possible that external forces may displace one of the parts in relation to the other. This may cause the sliding block of a conventional guide-roll to be pressed with an uneven pressure onto the bottom of the track. This is turn may result in uneven and sometimes excessive wear of the sliding block.

Thus, it is an object of the present disclosure to provide an improved guide-roll arrangement for guiding movement of second mast segment relative a first mast segment of a lift-truck, whereby said guide-roll arrangement solves or at least mitigates at least one of the problems of the prior-art. In particular, it is an object of the present disclosure to provide a guide-roll arrangement which has long service life. It is also an object of the present disclosure to provide a lift-truck comprising an improved guide-roll arrangement.

SUMMARY OF THE INVENTION

According to a first aspect of the present disclosure at least one of the aforementioned objects is met by a guide-roll arrangement 50 for guiding movement of a second mast segment 112, 113 of a lift-truck 100 relative a first mast segment 111, 112, 113 of said lift-truck 100, wherein said first and second mast segments 111, 112, 113 comprises an elongated track 114 having a bottom 115 and opposing sidewalls 116, 117, wherein the guide-roll arrangement 50 comprises:

a roll pin 10 having opposing first and second ends 11, 12, wherein the first end 11 comprises a recess 13; and a roll 20 supported on the roll pin 10; and a sliding element 30 arranged in the recess 13, said sliding element 30 comprising opposing contact and sliding surfaces 31, 32;

wherein the roll 20 is configured to engage one of the opposing sidewalls 116, 117 of the track 114 and the sliding surface 32 of the sliding element 30 is configured to slidable engage the bottom 115 of the track 114; and wherein the second end 12 of the roll pin 10 is configured to be attached to one of the first and second mast segments 111, 112, 113, and a support piece 40 arranged in the recess 13 of the roll pin 10 and comprising a contact surface 41 for supporting the sliding element 30, wherein the contact surface 31 of the sliding element 30 is supported on the contact surface 41 of the support piece 40 and wherein one of the contact surfaces 31, 41 of the support piece 40 and the sliding element 30 is concave and the other of the contact surfaces 31, 41 of the support piece 40 and the sliding element 30 is convex.

In the guide-roll arrangement according to the present disclosure, the mating concave/convex contact surfaces of the sliding element and the support piece allows the sliding element to move freely in all directions and by any suitable angle in the guide roll arrangement. The sliding surface of the sliding block may thereby remain with constant pressure in contact with the bottom of the track regardless of any angular displacement between the two relatively movable mast segments of the lift-truck. In operation, this reduces considerably the wear of the sliding element which in turn results in less downtime of the lift-truck due to maintenance and reduced operational cost for the lift-truck.

A second aspect of the present disclosure is a lift-truck 100 comprising an extendable mast 110 having at least a first and a second mast segment 111, 112 wherein said second mast segment 112 is movable relative said first mast segment 111, wherein said first and second mast segment 111, 112, 113 respectively comprises an elongated track 114 having a bottom 115 and opposing sidewalls 116, 117, and the lift-truck 100 comprises at least a first guide-roll arrangement 50 according to the present disclosure.

Further alternatives and advantages of the present disclosure are disclosed in the appended claims and the following detailed description.

DETAILED DESCRIPTION OF EMBODIMENTS

The guide-roll arrangement according to the present disclosure will now be described more fully hereinafter. The embodiments described hereinafter are provided by way of example so that this disclosure will be thorough and complete, and will fully convey the scope of the present disclosure to those persons skilled in the art. Same reference numbers refer to same elements throughout the description.

Figure 1:
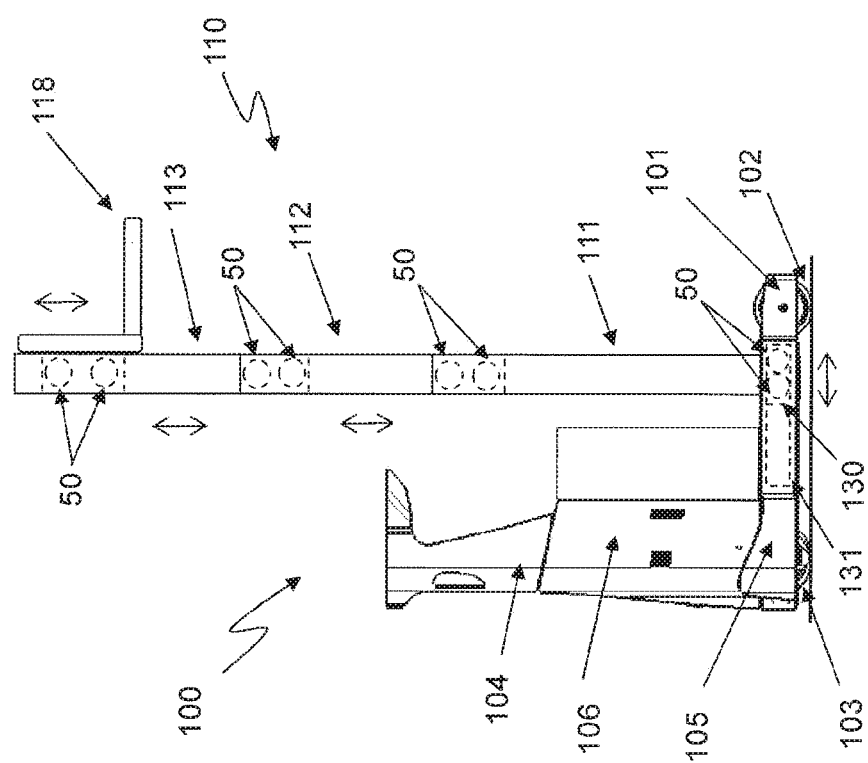
FIG. 1: A schematic side view drawing of a lift-truck according to the present disclosure.

FIG. 1 shows schematically a lift-truck 100 according to the present disclosure in side view. The lift-truck of FIG. 1 is a reach lift-truck. However, other lift-trucks are also contemplated with the scope of the present disclosure, for example stacker lift-trucks and order picker lift-trucks.

The lift-truck 100 comprises a mainframe 105 which in its forward portion extends into two forward support legs 101 carrying support wheels 102. A drive wheel 103 is arranged in the rear of the mainframe 105. In FIG. 1 only one of the support legs and the support wheels are shown. The mainframe 105 supports a chassis 106 in which an electrical drive motor for propelling the drive wheel and a hydraulic system for providing hydraulic power to movable parts on the lift-truck is accommodated (the motor and the hydraulic system are not shown in FIG. 1). The chassis 106 further comprises a driver's compartment 104, comprising a seat and controls for driving and controlling the lift-truck (not shown in FIG. 1). The lift-truck 100 further comprises an extendable lifting mast 110. The lifting mast 110 shown in FIG. 1 comprises three mast segments: a first outer mast segment 111, a second middle mast segment 112 and a third inner mast segment 113.

Figure 2:
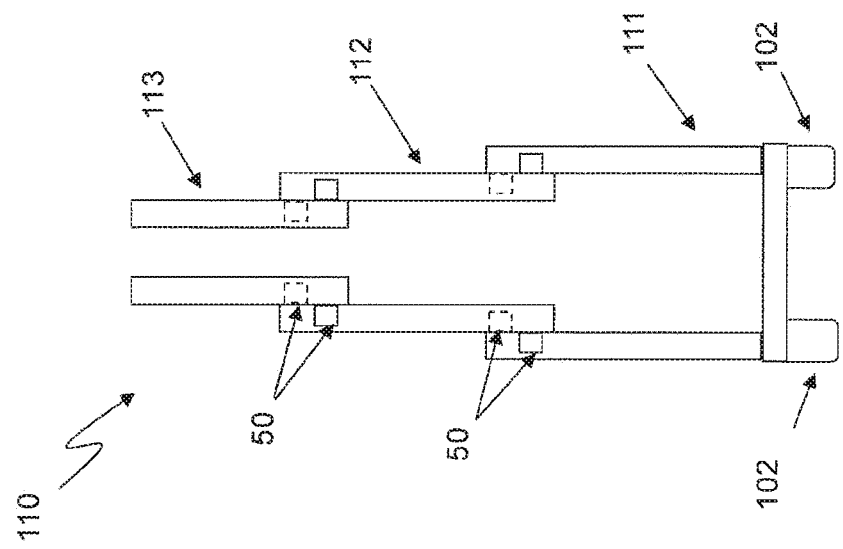
FIG. 2: A schematic front view drawing of the mast of a lift-truck according to the present disclosure.

FIG. 2 shows a front view of the lifting mast 110. Each mast segment thereby comprises two vertical uprights of e.g. I-beam shape that are interconnected by crossbars (not shown). The outer mast segment 111 is supported on the main frame 105 of the lift-truck. The middle mast segment 112 is arranged within the outer mast segment 111 and is arranged movable relative the outer mast segment 111. The inner mast segment 113 is arranged within the middle mast segment 112 and is arranged movable relative the middle mast segment 112. Actuation of the respective movable mast segments 112, 113 is performed by hydraulic lifting cylinders and lifting chains (not shown). The lifting mast 110 may also comprise further mast segments, such a forth and a fifth mast segment. It is also possible that the lifting mast 110 only comprises a first and a second mast segment.

Returning to FIG. 1. The lift-truck further comprises a load carriage 118, which is arranged movable in the inner mast segment 113 such that the load carriage 118 may be moved relative the inner mast segment 113 in vertical direction upwards or downwards. Different load engaging means may be attached to the load carriage 118, for example a lifting fork or clamping means such as gripping arms that are arranged movable towards each other for gripping and holding a load. In the lift-truck of FIG. 1 a lifting fork is attached to the load carriage 118.

As described, the lift-truck 100 of FIG. 1 is a reach lift-truck, i.e. a lift-truck having the capability of moving the lifting mast 110 parallel to the main frame 105 of the lift-truck. The outer mast segment 111 is thereby supported on a lifting mast carriage 130, which is arranged movable in the support legs 101 of the lift-truck such that the lifting mast may be moved relative the support legs 101 back and forth in direction from the rear of the lift-truck towards the support wheels 102. However, the lifting mast 110 may also be directly supported on the main frame 105 of the lift-truck, i.e. the outer mast segment 111 of the lifting mast 110 may be firmly fixed to the mainframe 105 of the lift-truck.

The lift-truck further comprises guide-roll arrangements 50 that are arranged to guide movement of the various parts of the lift-truck described above. Thus guide roll-arrangements 50 are arranged to guide movement of the second, middle, mast segment 112 relative the first, outer, mast segment 111. Guide-roll arrangements 50 are further arranged to guide movement of the third, inner, mast segment 113 relative the second, middle, mast segment 112 and vice versa. Guide-roll arrangements 50 may further be arranged to guide movement of the load carriage 118 relative the inner mast segment 113. Guide-roll arrangements 50 may also be arranged to guide movement of the lifting mast carriage 130 relative the support legs 101 of the lift-truck.

The guide-roll arrangement 50 according to the present disclosure is hereinafter described in detail with reference to the movable mast segments 111, 112, 113 of the lifting mast 110.

Figure 3A:
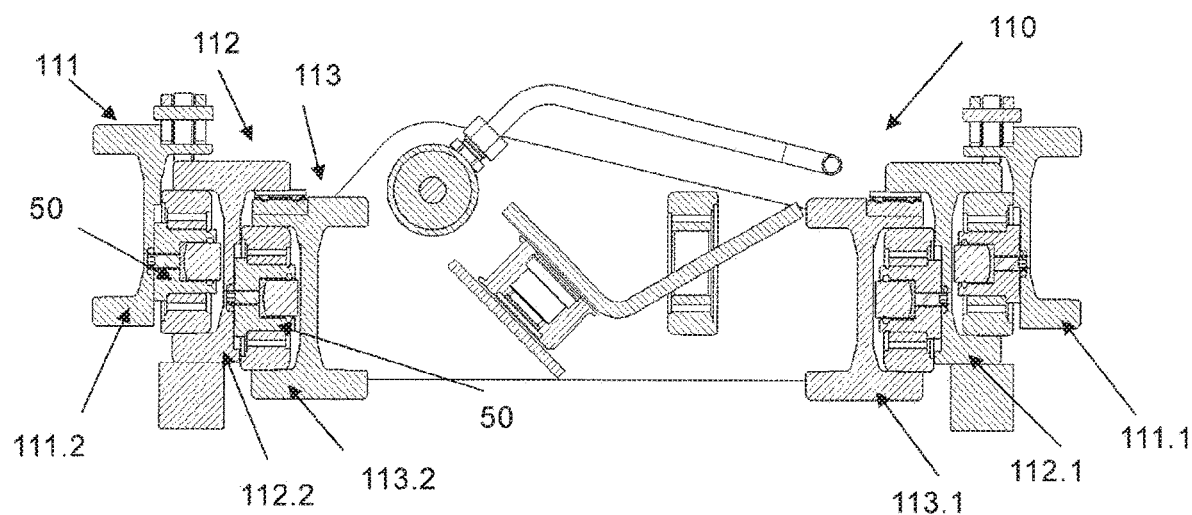
FIGS. 3a, 3b, 3c: Schematic cross-sectional drawings of the mast of a lift-truck according to the present disclosure.

FIG. 3a is a view from above of the lifting mast 110 of FIG. 2 and shows the mast segments 111, 112 and 113 of the lifting mast 110. The outer mast segment 111 comprises two uprights 111.1 111.2. The middle mast segment 112 comprises two uprights 112.1, 112.2 and the inner mast segment 113 comprises two uprights 113.1, 113.2. A first and a second guide-roll arrangement 50 are attached to the respective uprights 111.1 and 111.2 of the outer mast segment 111 and a third and a fourth guide-roll arrangement 50 are attached to a respective upright 112.1, 112.2 of the middle mast segment 112.

Figure 3B:
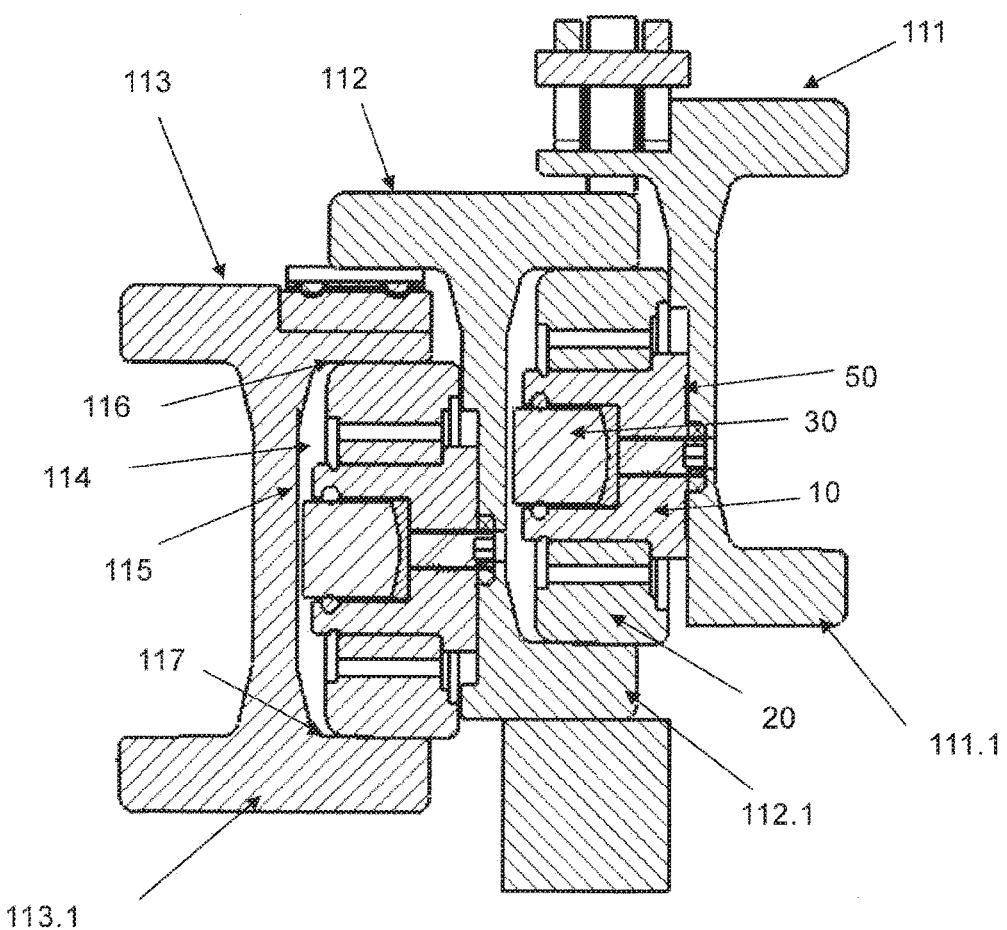

FIG. 3b is an enlarged cross-sectional view of the right side of the lifting mast of FIG. 3a and shows the right uprights 111.1, 112.1 and 113.1 of the mast segments 111, 112, 113 in cross-section. It is appreciated that the left side uprights 111.2, 112.2, 113.2 are identical to the right side uprights 111.1, 112.1, 113.1. Each of the uprights of the respective mast segments 111, 112, 113 comprises at least one elongated track 114 having a bottom 115 and two opposing sidewalls 116, 117. The track 114 extends along the respective upright of each mast segment in axial direction between the ends of the mast segment. The elongated track 114 may thereby extend along the entire upright or along a portion thereof. Depending on the mast configuration, an upright may comprise one track 114 or two tracks 114. Thus, a first track 114 may extend along a first side of an upright and a second track 114 may extend along a second side of the same upright.

A guide-roll arrangement 50 is arranged between the outer mast segment 111 and the middle mast segment 112 and between the middle mast segment 112 and the inner mast segment 113. The guide-roll arrangement 50 is thereby attached to one mast segment, e.g. the upright 111.1 of the outer mast segment 111 such that its roll 20 engages one of the opposing sidewalls 116, 117 of the track 114 in the adjacent upright 112.1 of the middle mast segment 112 and such that the sliding block 30 engages the bottom 115 of the track 114.

Figure 3C:
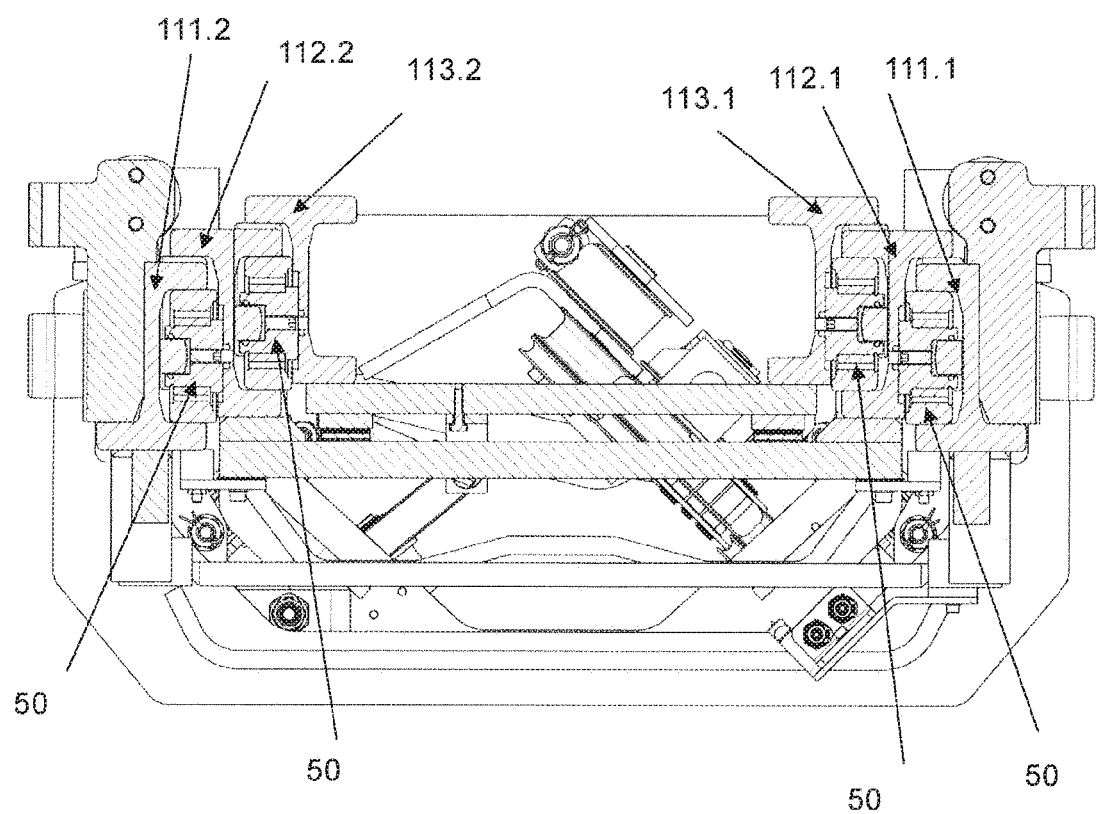

FIG. 3c is a view from below of the lifting mast 110 of FIG. 2 and shows that the lifting mast 110 comprises further guide-roll arrangements 50 arranged in inverted order with regards to the guide-roll arrangements shown in FIG. 3a. Thus, a fifth and sixth guide-roll arrangements 50 are attached to a respective upright 112.1, 112.2 of the middle mast segment 112 such that their respective rolls 20 engages a track 114 on the adjacent uprights 111.1 and 111.2 of the outer mast segment 112. A seventh and eight guide-roll arrangement 50 are attached to a respective upright 113.1 and 113.2 of the inner mast segment 113 such that their respective rolls 20 engages an opposing sidewall 116, 117 of a track 114 on an respective adjacent upright 112.1, 112.2 of the middle mast segment 112.

Figure 4:
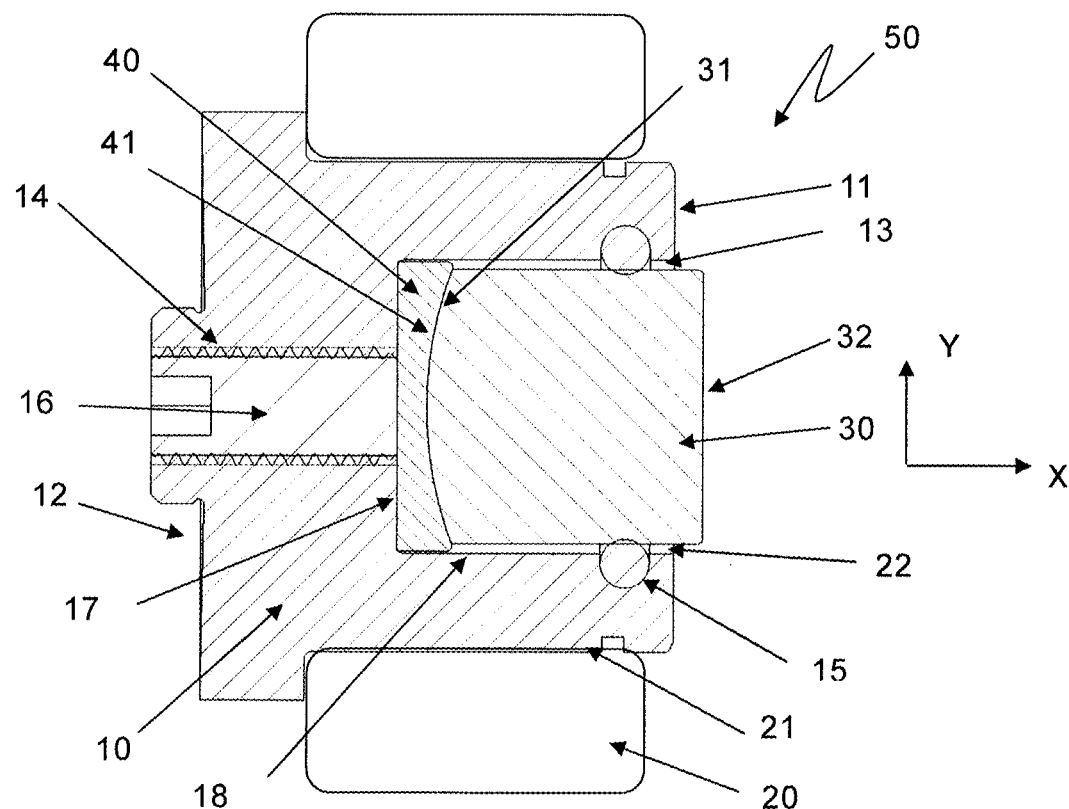
FIG. 4: A schematic side view drawing showing a guide-roll arrangement according to the present disclosure.

FIG. 4 shows a guide-roll arrangement 50 according to the present disclosure in detail. The guide-roll arrangement comprises a roll pin 10, also denominated hub, which forms the center of the guide-roll arrangement 50. The roll pin 10 is of rotational symmetric cross-section, typically of circular cross-section, and comprises opposing first and second ends 11, 12. Thus, the first and the second ends 11, 12 faces away from each other. The roll pin 10 further comprises an envelope surface 21 which extends between the first and second ends 11, 12. A roll 20 is supported on the envelope surface 21 of the roll pin 10. The roll 20 is journaled by ball bearings in the roll pin 10 such that it may rotate around the roll pin (not shown in FIG. 4, but indicated in FIG. 3b). The first end 11 of the roll-pin 10 comprises a recess 13 which extends from the first end 11 towards the second end 12. The recess 13 is thereby arranged in the centre of the roll pin 10. The recess 13 may be cylindrical and has a bottom 17 and a circumferential wall 18. A sliding member 30 is arranged in the recess 13 such that the sliding surface 32 of the sliding member extends out of the recess 13. The sliding block 32 is typically a solid piece of e.g. plastic, brass or graphite.

The second end 12 of the roll pin 10 is configured to be attached to any of the mast segments 111, 112, 113 of the lift-truck. Attachment of the second end 12 of the roll pin 10 to a mast segment may be performed by welding.

The roll 20 of the guide-roll arrangement 50 may be made of steel and is configured to engage one of the two opposing sidewalls 116, 117 of the elongated track 114 in the mast segment. The roll is configured to engage, i.e. be in rolling contact with, one of the opposing sidewalls 116, 117 or the track 114. The diameter of the roll is therefore less than the distance between the two opposing sidewalls 116, 117 of the track 114. For example, when the roll engages one of the opposing sidewalls 116, 117 there is a small gap between the roll and the other sidewall, for example of 2-5 mm. The sliding block 30 is configured such that the sliding surface 32 may engage the bottom 115 of the track 114 (see FIG. 3b).

According to the disclosure, a support piece 40 is arranged in the recess 13. The support piece 40 is arranged on the bottom 17 of the recess and comprises a contact surface 41 for supporting the sliding element 30. The contact surface 41 is thereby facing away from the bottom 17 of the recess. The sliding element 30 has a contact surface 31 which is opposite the sliding surface 32. The sliding element 30 is supported onto the support piece 40 such that the contact surface 31 of the sliding element 30 is in contact with the contact surface 41 of the support piece. The sliding element is thereby freely movable, i.e. slidable, over the contact surface 41 of the support piece 40. Thus, there are no retaining elements or forces between the contact surfaces 31, 41 of the support piece 40 and the sliding element 30.

Further according to the disclosure, one of the contact surfaces 31, 41 of the sliding element 30 and the support element 40 is convex and the other of the contact surfaces 31, 41 is concave. Thus, as shown in FIG. 5, the contact surface 41 of the support element 40 is concave and the contact surface 31 of the sliding element 30 is convex. However, it is possible to design the support element 40 and the sliding element 30 such that the contact surface 41 of the support element 40 is convex and the contact surface 31 of the sliding element 30 is concave.

Figures 5A, 5B:
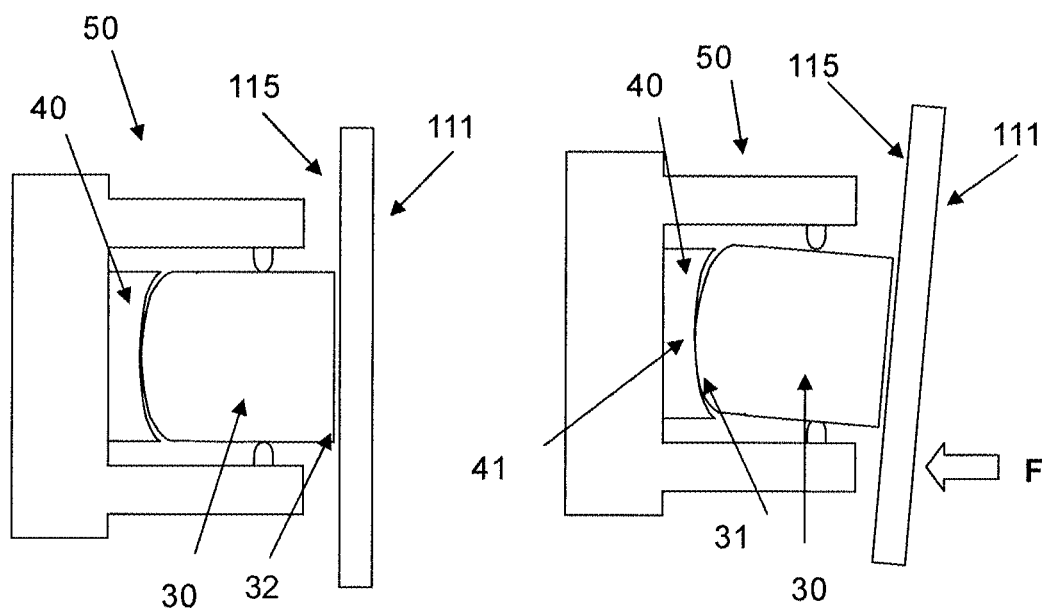
FIGS. 5a, 5b: A schematic drawing showing the functional principle of the guide-roll arrangement according to the present disclosure.

The advantage of freely supporting a sliding element 30 having a convex contact surface on concave support surface 41 of a support element 40 is illustrated in FIGS. 5a and 5b.

In FIG. 5a the sliding element 30 is supported on the support piece 40 and the sliding surface 32 of the sliding element 30 is engaging the bottom 115 of a track in outer mast segment 111 which is oriented in a substantially straight vertical direction. The roll of the guide-roll element and the opposing sidewalls of the track in the mast segment have been omitted for clarity.

In FIG. 5b, the outer mast segment 111 is subjected to an external force F which displaces the mast segment 111 from the straight vertical orientation of FIG. 5a. However, the convex contact surface 31 of the sliding element 30 slides freely over the concave contact surface 41 of the support piece 40 and the angular orientation of the sliding element 30 follows thereby the angular deviation of the outer mast segment 111. The sliding surface 32 of the sliding element 30 therefore remains in full contact with the bottom 115 of the track along the mast segment 111.

Returning to FIG. 4. Preferably, both the sliding element 30 and the support piece 40 are of circular cross-section and the contact surfaces 31 and 41 of the respective sliding element 30 and the support piece 40 are spherical. This is advantageous since the mating spherical surface contact surfaces 31 and 41 allows for free mobility of the sliding element 30 in all directions around its centre axis. Preferably, the contact surfaces 31, 41 of the sliding element 30 and the support piece 40 have the same diameter.

Preferably, the contact surface 31 of the sliding element 30 is convex and the contact surface 41 of the support piece 40 is concave. This design allows for a stable movement of the contact surface 31 of the sliding element 30 over the contact surface 41 of the support piece 40 and also for improved self-centering of the sliding element 30. The convex contact surface 31 of sliding element 30 is typically achieved by a rounded end of the sliding element 30. The concave contact surface 41 of the support piece 40 is typically provided by a depression in the support piece.

The sliding element 30 is preferably dimensioned such that its outer diameter is less than the inner diameter of the recess 13. The diameter of the sliding element 30 and the recess 13 are thereby dimensioned such that a predefined gap 22 is achieved between the outer surface of the sliding element 30 and the circumferential wall 18 of the recess 13. The purpose of the gap 22 is to control the degree of mobility of the sliding element and the dimension of the gap 22 is thereby selected in dependency of the construction of the lift-truck in question. For example, the gap may be 1-2 mm.

To further control the degree of mobility of the sliding element 30, an annular distance element 15 may be provided in the circumferential wall 18 of the recess 13 for supporting the sliding element 30 in radial direction Y. The annular distance element 15 is preferably of elastic material, such as rubber, and arranged in an upper portion of the recess 13. The annular distance element 15 is preferably of circular cross-section and attached to the circumferential wall 18 of recess 13 such that it contacts the sliding element 30. For example, the annular distance element is partially inserted into a groove 18 in the circumferential wall of the recess 13. The annular distance element 15 thereby retains the sliding element 30 within the recess 13 and ensures further that the sliding element 30 does not press into the circumferential wall 18 of the recess 13 when it slides over the bottom of the track. This could result in that the sliding element gets stuck in the circumferential wall 18 of the recess 13.

The guide-roll arrangement 50 may further comprise a bore 14, such as a threaded bore, extending from the second end 12 of the roll-pin 10 to the recess 13. A threaded adjustment element 16, such as a threaded screw or bolt, may be arranged trough the threaded bore and connected to the support piece 40 to provide the possibility of moving the support piece 40 and thus the sliding element 30 in axial direction of the roll-pin (This allows for simple adjustment of the sliding element 30.

The radial direction Y and the axial direction X are indicated by arrows in FIG. 4.

When in the present disclosure reference is made to a first mast segment and a mast second segment this is made for illustrative purpose only. It is appreciated that, for example, the middle mast segment may be considered a first mast segment and that the inner mast segment may be considered a second mast segment when the inner mast segment moves relative the middle mast segment.

The invention claimed is:

1. A guide-roll arrangement for guiding movement of a second mast segment of a lift-truck relative to a first mast segment of said lift-truck, wherein the first and second mast segments respectively comprises an elongated track having a bottom and opposing sidewalls, wherein the guide-roll arrangement comprises:
   a roll pin having opposing first and second ends, wherein the first end comprises a recess, a roll supported on the roll pin, and a sliding element arranged in the recess, the sliding element having a contact surface and an opposing sliding surface;
   wherein the roll is configured to engage one of the opposing sidewalls of the track,
   wherein a portion of the sliding surface of the sliding element continuously contacts the bottom of the track as the sliding element translates along the track,
   wherein the second end of the roll pin is configured to be attached to one of the first and second mast segments,
   wherein a support piece is arranged in the recess of the roll pin and has a support piece contact surface for supporting the sliding element,
   wherein the contact surface of the sliding element is supported on the support piece contact surface, and allows for radial movement of the sliding element in the recess, and
   wherein one of the support piece contact surface and the contact surface of the sliding element is concave and the other of the support piece contact surface and the contact surface of the sliding element is convex.

2. The guide-roll arrangement according to claim 1, wherein the sliding element and the support piece have circular cross-sections and the contact surface of the sliding element and the support piece contact surface are spherical.

3. The guide-roll arrangement according to claim 1, wherein the contact surface of the sliding element is a rounded end of the sliding element and the support piece contact surface is a depression in the support piece.

4. The guide-roll arrangement according to claim 1, wherein the contact surface of the sliding element and the support piece contact surface have corresponding diameters.

5. The guide-roll arrangement according to claim 1, wherein the recess comprises an annular distance element for supporting the sliding element in radial direction (Y) of the recess.

6. The guide-roll arrangement according to claim 5, wherein the annular distance element comprises elastic material and is configured to allow radial movement of the sliding element in the recess.

7. The guide-roll arrangement according to claim 1, further comprising a threaded adjustment element extending through a threaded bore from the second end of the roll pin to the recess, wherein the threaded adjustment element is connected to the support piece to move the support piece in axial direction (X) of the roll pin.

8. A lift-truck comprising an extendable mast having at least a first and a second mast segment wherein said second mast segment is movable relative said first mast segment, wherein said first and second mast segments respectively comprise an elongated track having a bottom and opposing sidewalls, and the lift-truck comprises at least a first guide-roll arrangement according to claim 1.

9. The lift-truck according to claim 8 wherein at least a first and a second guide-roll arrangement are attached to the second mast segment and wherein at least a third and a fourth guide-roll arrangement are attached to the first mast segment.

10. The lift-truck according to claim 8, comprising a third mast segment which is movable relative said second mast segment.

11. The lift-truck according to claim 10 wherein at least a fifth and a sixth guide-roll arrangement are attached to the second mast segment and wherein at least a seventh and an eight guide-roll arrangement are attached to the third mast segment.

12. The guide-roll arrangement according to claim 1, wherein the sliding element is configured to pivot relative to the support piece.

13. The guide-roll arrangement according to claim 1, wherein the sliding surface of the sliding element is parallel to the bottom of the track.

14. The guide-roll arrangement according to claim 1, wherein the contact between the sliding surface of the sliding element and the bottom of the track generates a constant pressure.

* * * * *